United States Patent
Clüsserath

(10) Patent No.: US 10,106,388 B2
(45) Date of Patent: Oct. 23, 2018

(54) CONTAINER PROCESSING MACHINE AND METHOD FOR DELIVERING CONTAINERS TO AND/OR REMOVING THEM FROM A CONTAINER PROCESSING MACHINE

(71) Applicant: KHS GMBH, Dortmund (DE)

(72) Inventor: Ludwig Clüsserath, Bad Kreuznach (DE)

(73) Assignee: KHS GmbH, Dortmund (DE)

( * ) Notice: Subject to any disclaimer, the term of this patent is extended or adjusted under 35 U.S.C. 154(b) by 321 days.

(21) Appl. No.: 14/782,101

(22) PCT Filed: Mar. 14, 2014

(86) PCT No.: PCT/EP2014/000708
§ 371 (c)(1),
(2) Date: Oct. 2, 2015

(87) PCT Pub. No.: WO2014/161635
PCT Pub. Date: Oct. 9, 2014

(65) Prior Publication Data
US 2016/0046476 A1  Feb. 18, 2016

(30) Foreign Application Priority Data
Apr. 3, 2013  (DE) ........................ 10 2013 103 309

(51) Int. Cl.
*B67C 3/26* (2006.01)
*B67C 3/24* (2006.01)
*B65G 47/84* (2006.01)
*A47L 15/24* (2006.01)
*B65G 37/00* (2006.01)

(52) U.S. Cl.
CPC ............ *B67C 3/242* (2013.01); *A47L 15/248* (2013.01); *B65G 37/00* (2013.01); *B65G 47/846* (2013.01); *B67C 3/244* (2013.01)

(58) Field of Classification Search
CPC ......... B67C 3/242; B67C 3/244; C65G 37/00; C65G 47/846; A47L 15/248
See application file for complete search history.

(56) References Cited

FOREIGN PATENT DOCUMENTS

| DE | 30 43 019 | 10/1982 |
|---|---|---|
| DE | 31 33 341 | 3/1983 |
| DE | 3813250 | 11/1989 |
| DE | 3903933 | 8/1990 |
| DE | 90 17 262 | 3/1991 |
| DE | 197 41 476 | 3/1999 |
| DE | 103 25 693 | 7/2004 |
| DE | 10 2006 017706 | 10/2007 |
| DE | 10 2008 020 116 | 10/2009 |
| DE | 20 2009 012 064 | 2/2011 |
| DE | 10 2011 079 078 | 1/2013 |
| EP | 0 486 439 | 5/1992 |
| EP | 1 484 279 | 12/2004 |
| EP | 2412651 | 2/2012 |

(Continued)

Primary Examiner — Jason K Niesz
(74) Attorney, Agent, or Firm — Occhiuti & Rohlicek LLP

(57) ABSTRACT

A container-processing machine includes a conveyor that rotates about a vertical machine axis, processing stations disposed around the conveyor, a star that delivers unprocessed containers to the conveyor and removes processed containers from the conveyor, and recesses disposed around a periphery of the star for engaging containers. Container transfer occurs by raising a container from a transfer position into a processing position.

24 Claims, 7 Drawing Sheets

(56) References Cited

FOREIGN PATENT DOCUMENTS

| WO | WO95/29860 | 11/1995 |
| WO | WO2007/025909 | 3/2007 |
| WO | WO2013/007430 | 1/2013 |

CONTAINER PROCESSING MACHINE AND METHOD FOR DELIVERING CONTAINERS TO AND/OR REMOVING THEM FROM A CONTAINER PROCESSING MACHINE

RELATED APPLICATIONS

This application is the national stage under 35 USC 371 of international application PCT/EP2014/000708, filed on Mar. 14, 2014, which claims the benefit of the Apr. 3, 2013 priority date of German application DE102013103309.1, the contents of which are herein incorporated by reference.

FIELD OF INVENTION

The invention concerns a container-processing machine and a method for delivering containers to and/or removing containers from a container-processing machine.

BACKGROUND

Known container processing machines include those in which a conveyor rotates about a vertical machine axis. An inlet star delivers containers to such processing machines, and an outlet star removes processed containers from the processing machine.

SUMMARY

In one aspect, the invention features an apparatus for processing containers. Such an apparatus includes a container-processing machine that has a conveyor that rotates about a vertical machine axis, processing stations disposed around the conveyor for processing containers, a star that delivers containers that are in a first state to the conveyor and removes containers that are in a second state from the conveyor, and recesses disposed around a periphery of the star for engaging containers. Containers in the first state are containers that are to be processed by one of the processing stations, and containers in the second state are containers that have been processed by one of the processing stations. The container-processing machine transfers a container that is in the first state to a processing station of the container-treatment machine by raising the container from a transfer position into a processing position.

In some embodiments, the container-processing machine has first and second levels. Delivery of containers to the conveyor by the star and removal of the containers from the conveyor by the star takes place at the lower first level. Processing of containers at the processing stations occurs at the higher second level.

Some of the foregoing multilevel embodiments include lifters on the conveyor. Each lifter raises a container from the first level up to the second level and lowers a container from the second level down to the first level. In some of these embodiments, each lifter is assigned to a corresponding processing station, and each lifter operates independently of other lifters on the conveyor. Also among these embodiments are those in which the lifter comprises a neck-ring holder for lateral gripping of a container underneath a neck ring thereof, those in which the lifter is configured to move in a radial direction relative to a machine axis of the conveyor, and those in which each of the lifters comprises a holder that is configured to grip a container. An example of a holder is a gripper that comprises first and second interacting gripper elements that are movable to enable transfer of a container between the conveyor and the star to proceed without hindrance. Alternatively, the holder can be configured to move in a radial direction relative to a machine axis of the conveyor.

Other embodiments include those in which the conveyor and the star are driven independently of each other, those in which conveyor and the star are configured to be driven intermittently, and those in which the conveyor is configured to be driven to rotate in a first direction while the star is configured to be driven to rotate in a second direction that is opposite the first direction.

In yet other embodiments, the conveyor is configured for phased rotation in a first direction along an angle. In these embodiments, the star rotates in a second direction opposite the first direction. The rotation in the second direction and the phased rotation in the first direction occur simultaneously to allow collision-free gripping of the container by the holder.

Also among the embodiments are those in which the conveyor runs underneath the star.

Further embodiments include those in which the container-processing machine comprises a filling machine, those in which it comprises a rinsing machine, and those in which it comprises an inspection machine.

In another aspect, the invention features a method for transferring containers between a conveyor of a container-processing machine and a star. Such a method includes delivering a first container to a recess on a circumference of the star, the container being in a first state, as a result of rotation of the star, moving the first container to a transfer position, with the container now at the transfer position, raising the container from the transfer position into a processing position at a processing station on the conveyor, with the first container now engaged at the processing position, rotating the conveyor to a position at which a second container, which is in a second state, is positioned above a free recess of the star, transferring the second container into the free recess, and removing the second container. A container in the first state is a container that has yet to be processed by the container-processing machine. A container in the second state is a container that has already been processed by the container-processing machine.

In some practices, raising the container includes lifting the first container with a lifter that is provided on the conveyor. In these practices, lifting the first container forms a free recess in the star.

Some practices include those in which transferring the second container into the free recess includes using a lifter associated with a processing station at which the second container was processed to lower the second container into the free recess. Among these are practices that include swiveling a lifter's holder so as to avoid a collision with a container moved by the star during rotation of at least one of the conveyor and the star.

Other practices further include driving the conveyor and the star independently of each other.

Yet other practices include driving both the conveyor and the star in a phased manner.

Additional practices include, during a first interval, causing the conveyor and the star to rotate in opposite directions, and, during a second interval, causing the conveyor and the star to rotate in the same direction. Among these are practices that include, during the first interval, swiveling an element out of the way to promote collision-free transfer of the container at the transfer position.

Also among the practices are those that include using the conveyor to deliver a container to the star, passing the conveyor under the star, and removing the container from the star.

Yet other embodiments include filling the container at the processing position.

In another aspect, the invention features a container-processing machine that includes a conveyor that rotates about a vertical machine axis, processing stations disposed around the conveyor, a star that delivers unprocessed containers to the conveyor and removes processed containers from the conveyor, and recesses disposed around a periphery of the star for engaging containers. Container transfer occurs by raising a container from a transfer position into a processing position.

In yet another aspect, the invention features a container-processing machine having a conveyor that rotates about a vertical machine axis with a plurality of processing stations for processing containers and a single transfer star by means of which containers to be processed are delivered to the conveyor and already-processed containers are removed from the conveyor. The transfer star has recesses arranged around its circumference. These recesses receive containers for delivery and removal. This arrangement provides a simple and relatively problem-free way to deliver and remove containers.

In some embodiments, the transfer star is circular and each recess forms a notch that is shaped like part of a circle. Each notch defines a container holder. An external conveyor can thus move containers to be processed into these recesses. Turning the transfer star about a further machine axis parallel to the machine axis of the conveyor then moves the container along a path shaped like an arc of a circle and delivers the container to the conveyor of the processing machine.

In some embodiments, delivery and removal of the containers by the transfer star takes place at a first level, and the processing of the containers at the processing stations takes place at a second level that lies above the first level. This offset in levels provides several advantages. One advantage is that a container-to-be processed can be lifted out of the recess, thus freeing a container holder to receive an already-processed container. Another advantage is that it becomes possible to create a movement space so that a container-to-be processed can be taken from a container holder and an already-processed container can be introduced into this recently vacated container holder. Yet another advantage is that it becomes possible for the circular path of containers in the transfer star and the circular path of containers in the conveyor to touch each other at a tangential contact point. More precisely, since the two paths are on different planes, the projection of one path has a tangent point with the other path.

Having different delivery and processing levels is however not essential. In particular, in the case where the container is free standing and does not need to be held in a puck, the multi-level arrangement is unnecessary. In addition, for those container-processing methods that do not rely on a container being in a sealed position in a processing device different levels are not necessary. An example of such a method is free-jet filling.

Delivery and removal of containers by the transfer star takes place by suitably controlling rotational movements and rotational directions the conveyor and the transfer star.

One embodiment includes a lifter on the conveyor, the lifter being assigned to one or more processing stations. The lifter raises a container from the first level to the second level and lowers the container from the second level to the first level. Once the lifter raises a container-to-be processed, the space between the delivery level and the processing level is available to rotate the conveyor further in a phased and collision-free manner so that the next processing station lies above the vacated container holder. An already-processed container then can be delivered to the container holder by lowering the lifter. This results in simple and problem-free delivery and removal of the containers.

In some embodiments, each processing station of the conveyor is assigned to its own independent lifter. Being part of the conveyor, this lifter is carried along together with the containers when the conveyor rotates. The lifter can be used for holding a container at a processing station. The lifter can also be used to press a container in a vertical direction onto a processing station. This is particularly useful for filling the containers with liquid contents.

In some embodiments, the conveyor and the transfer star are driven independently of each other. In this way, following the removal of a container from a container holder of the transfer star, the transfer star itself can remain stationary while the conveyor rotates about an angle corresponding to a machine division. This permits introduction of a container located on the next processing station into a container holder that has just been vacated as a result of having removed the empty container within it. Being able to independently drive the conveyor and the transfer star also optimizes overall operation of the container-processing machine.

In some embodiments, the conveyor and the transfer star are driven in a reciprocally phased or intermittent manner. This enables the transfer star to rotate about an angle when the conveyor is stationary. It also enables the conveyor to rotate about an angle while the transfer star is stationary. The result is phased delivery or removal of the containers. The phased drive also permits simultaneous stoppage of the conveyor and the transfer star. This is useful for the transfer of a container from the transfer star to the processing station of the conveyor.

In some embodiments, the conveyor and/or the transfer star are designed so that they can be driven in different directions of rotation. This enables either the conveyor or the transfer star to change its direction of rotation. The ability to do so improves slotting of the holder on the containers and permits readjustment of the relative positions of the conveyor and the transfer star.

In some embodiments, the lifter has a holder that laterally grips a container. Some of these holders grip a container neck so that the lifter can then lift the container.

In other embodiments, the holder is a single holding element with a recess adapted to the container neck to grip at least part of the container neck underneath a thickening or projection of the container neck.

In yet other embodiments, the holder is a gripper that has at least two interacting gripper elements that move in such a way that the entry of a container-to-be processed or the exit of an already-processed container proceeds without hindrance. These grippers grip a container in a pincer-like manner so that a secure holding of the container on the lifter becomes possible.

In alternative embodiments, the lifter has a holder that is a neck-ring holder. The neck-ring holder laterally grips a container underneath the neck ring provided on the container neck. To accomplish this, the neck-ring holder has a recess shaped like an arc of a circle. The circle's radius of curvature corresponds to the dimensions of the container neck underneath the neck ring. This provides a simple way to secure the container on the lifter. In those cases where the container-processing machine is a filling machine, this also provides a way to exert pressure on the processing station when filling the container.

Embodiments include those in which the conveyor carries out phased rotation about an angle against the direction of rotation of the simultaneously rotated transfer star to allow a collision-free partial gripping of the container by the holder. This enables slotting of the container into a recess of the holder. The conveyor can be rotated initially starting from a starting position, in which a processing station is located at the transfer position between the conveyor and transfer star. The conveyor then rotates about an angle in the direction of rotation of the transfer star to orient the recess of the holder in the direction of an incoming container that is being moved by the transfer star. Then, the conveyor changes direction and starts rotating back to the transfer position against the ongoing direction of rotation of the transfer star. This results in a collision-free gripping of the container with the lifter's holder.

Alternatively, it is also possible for the holders to swivel about a vertical axis parallel to the machine axis of the conveyor. The holder swivels starting from a radial orientation relative to the first machine axis of the conveyor in such a way that the holder's recess is oriented in the direction of the container to be moved into the recess. After moving the container, or its neck, into the recess, the holder and the container swivel together until both reach the transfer position. This achieves collision-free slotting of the holder. In the same way, swiveling the holder in the direction of motion of the removed container results in a collision-free removal of the container from the recess.

In some embodiments, a holder moves radially relative to the conveyor's machine axis. In such cases, after the delivery of a container to the transfer position, the holder can be brought from a withdrawn position, at which it is at some distance from the container, into a forward position, in which it holds the container. This results in a collision-free entry and exit of the container.

In some embodiments, delivery and removal of the containers to and from the transfer star takes place using a single conveyor running underneath the transfer star. The conveyor can be formed by a rotating conveyor belt, a rotating conveyor chain, or by similar conveyor installations. The conveyor is preferably linear so that delivery and removal of containers takes place in the same physical direction. Moreover, the conveyor preferably runs centrally below the machine axis around which the transfer star rotates. Thus, the delivery and removal can be achieved with low technical complexity.

In some embodiments, the container-processing machine is a filling machine. A rotating filling machine carries containers through first and second sectors of the circle. While a container is in the first sector, it is possible to fill it. While the container is in the second sector, it is only being moved, not filled. Therefore, it is a waste of time for the container to be in the second sector.

Using a single transfer star to both deliver and remove containers minimizes the extent of the second sector. Thus, the container spends almost all of its time in the first sector, where it can be filled. This is hugely advantageous for large-volume containers, such as PET kegs.

In another aspect, the invention features a method for delivering and/or removing containers to/from a container-processing machine comprising a conveyor rotating about a vertical machine axis with a plurality of processing stations for processing containers and a single transfer star with container holders, by means of which containers to be processed are delivered and already-processed containers are removed. Such a method includes delivering at least one container-to-be processed to a container holder of the transfer star, wherein the container holder is formed by a recess in the transfer star arranged on the circumference; conveying the container-to-be processed to a transfer position and/or alignment of the container-to-be processed to a transfer position by the transfer star; transferring the container-to-be processed to a processing station of the conveyor; rotating the conveyor to position an already-processed container using a container-free container holder of the transfer star; transferring the already-processed container to the container-free container holder of the transfer star; and removing the processed container.

In some embodiments, the transfer of the container-to-be processed to a processing station of the conveyor takes place by raising the container-to-be processed from the transfer position into a processing position. This creates a container-free container holder into which, after the rotation of the conveyor, an already-processed container positioned over this container-free container holder can be inserted. By raising the container and by subsequently rotating the conveyor relative to the stationary transfer star, it is possible to vacate a container holder in one working step with and to then fill it with an already-processed container in the following working step. Then, a phased further rotation of the transfer star delivers this already-processed container from the transfer position to the conveyor. This results in a speedy and problem-free delivery or removal of the containers using just a single transfer star.

In some embodiments, the lifter has a holder that grips at least part of a container. Swiveling or shifting this holder in an appropriate way allows it to avoid colliding with a container being moved by the transfer star when relative rotation exists between the conveyor and the transfer star.

Another way for the holder to achieve collision-free gripping of the container during delivery or release of containers is to rotate the conveyor and the transfer star at the same time but in opposite directions.

In some embodiments, the container-processing machine is a filling machine and the containers are filled with a product during the entire duration or substantially the entire duration of the complete rotation of the conveyor. Using an individual transfer star for the delivery or removal of the containers minimizes the extent of an angle during which the conveyor of the processing machine cannot be used for the filling operation.

As used herein, the word "containers" includes bottles, cans, or similar containers made of any material suitable for this purpose, in particular glass, plastic, or metal.

As used herein, a "container-processing machine" is any machine with which container processing can be carried out. These include, without limitation, filling machines, cleaning machines, inspection machines, and machines for applying presentation features to containers.

As used herein, a "recess" is any holder that is suitable for securing a container to the transfer star or guiding the container at the transfer star. Recesses can also be part of holding-and-securing elements that are arranged on the circumference of the transfer star and that secure the particular container on the transfer star. The holding-and-securing elements can form a holder in which the containers engage and/or can be designed as grippers, including spring-loaded grippers. This avoids the need for an external guide to prevent radially outward deviation of the containers.

As used herein, "substantially" and "approximately" refer to deviations from an exact value by ±10%, and preferably by ±5%, and/or deviations that are not significant for function.

BRIEF DESCRIPTION OF THE DRAWINGS

These and other features of the invention will be apparent from the following detailed description and the accompanying figures, in which.

DETAILED DESCRIPTION

Figure 1:
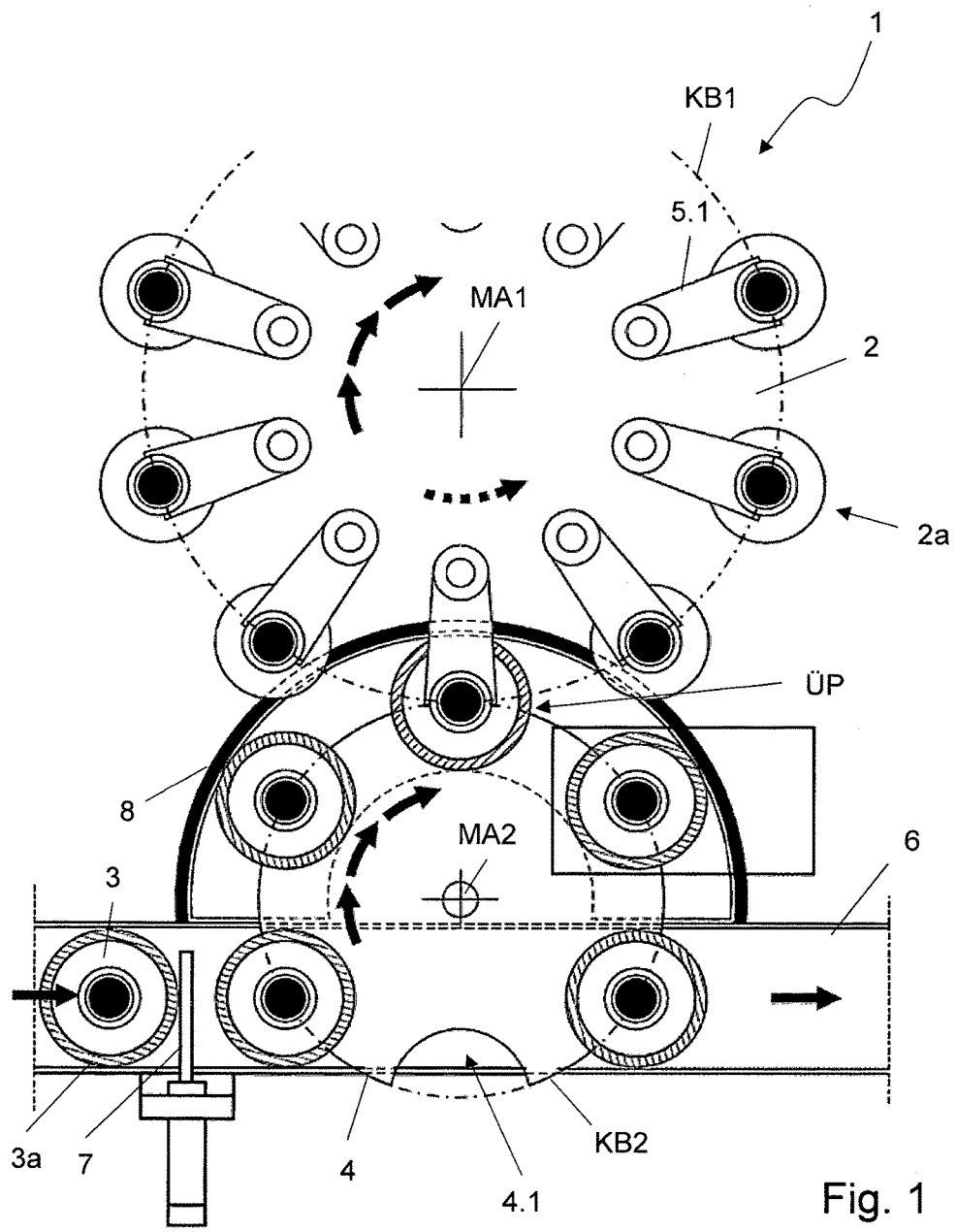
FIG. 1 shows a top view of a first embodiment of a container-processing machine.
Figure 2:
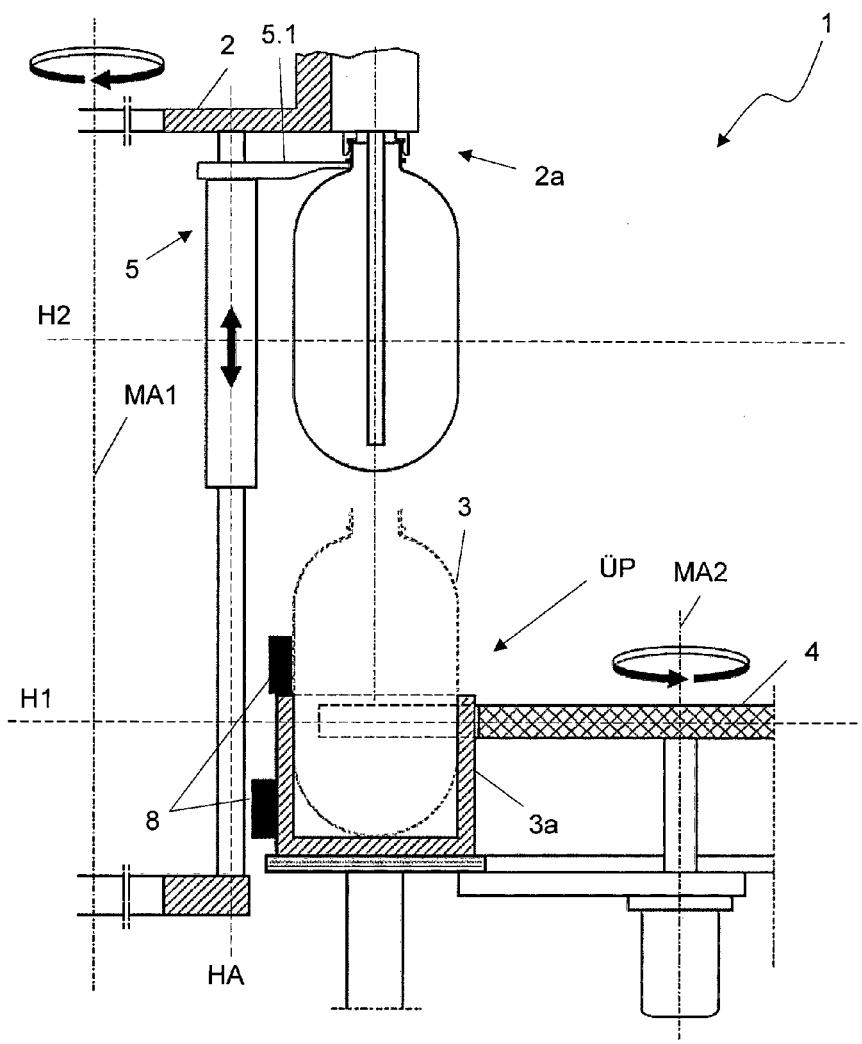
FIG. 2 shows a cross section of the container-processing machine of FIG. 1.

FIGS. 1 and 2 show a container-processing machine 1 having a first conveyor 2 that rotates about a vertical first machine axis MA1. In doing so, the first conveyor 2 carries containers 3 along a first circular path KB1.

Processing stations 2a are arranged around the circumference of the first conveyor 2. It is at these processing stations 2a that the processing of the containers 3 delivered to the container-processing machine 1 takes place.

In the particular embodiment shown, the container-processing machine 1 is a filling machine and the processing stations 2a have filling elements. The description will thus refer to containers as being empty and filled. However, it is understood that other kinds of processing machines can be used, such as rinsing machines or closing machines. In that case, the two container states would be "rinsed" and "unrinsed" or "open" and "closed."

A transfer star 4 carries containers 3 along a second circular path KB2 that has a point of tangency with the first circular path KB1. The transfer star 4 permits delivery and removal of containers 3 to and from the processing stations 2a.

The transfer star 4 interacts with a second conveyor 6 that brings empty containers 3 to the transfer star 4 and also takes filled containers 3 away from the transfer star 4. In the embodiment shown, the second conveyor 6 is a linear conveyor that passes underneath the transfer star 4. A suitable linear second conveyor 6 is a conveyor belt or a conveyor chain. In the embodiment shown, a single second conveyor 6 both delivers empty containers to the first conveyor 2 and removes filled containers from the first conveyor 2.

In the illustrated embodiment, the delivery of empty containers 3 and the removal of filled containers 3 takes place using container carriers, or pucks 3a. These pucks 3a are used for containers 3 that tend to topple over or containers that have no independent floor-standing area, such as the container shown in FIG. 2. Examples include PET kegs. These PET kegs are large-volume containers made of a plastic material. Typical volumes are 10 liters, 20 liters, and 30 liters.

Pucks 3a are not necessary for all containers 3. The container-processing machine 1 described herein can also process containers 3 without pucks 3a. To simplify the exposition, references herein to engaging the bottle 3 are intended to include either engaging the bottle 3 directly or engaging a puck 3a associated with the bottle 3.

According to FIG. 1, the second conveyor 6 delivers an upright container 3 to a stopper 7 just upstream of the transfer star 4. The stopper 7 temporarily stops the container 3 from proceeding further until such time as it is appropriate to allow the container 3 to proceed. At that point, the stopper 7 releases the container. This results in a time-phased release of containers 3 to the transfer star 4.

Shortly after the stopper 7 releases it, the container reaches the transfer star 4. A recess 4.1, which is one of many identical recesses disposed around the periphery of the transfer star 4, engages the container 3 so that transfer star 4 now moves the container 3.

The transfer star 4 rotates about a vertical second machine axis MA2 that runs parallel to and is displaced from the first machine axis MA1. As the transfer star 4 rotates about the second machine axis MA2, it moves the container 3 along a circular path by an angular increment until the container 3 reaches a transfer position ÜP. An outer guide 8 prevents radial deviation of the container 3 during its journey toward the transfer position ÜP. The outer guide 8 runs along an arc of a circle that surrounds the transfer star 4 just beyond its periphery.

A drive coupled to the transfer star 4 drives it in an incremental, or phased manner. A suitable drive for carrying out this task is a servo-motor. The transfer star 4 thus moves incrementally, in a time-phased manner under the influence of the servo motor.

In some embodiments, the transfer position ÜP is at the point of tangency where the first and second circular paths KB1, KB2 meet. A container 3 at the transfer position ÜP has its vertical axis passing through this tangential contact point.

By properly synchronizing movement of the transfer star 4 with the first conveyor 2, it is possible to ensure that a processing station 2a is always available to meet a container 3 upon its arrival at the transfer position ÜP. At the time a container 3 is presented, the processing station 2a is positioned to coincide with the tangential contact point.

Referring to FIG. 2, each processing station 2a includes a lifter 5 that can be shifted along a vertical lifter axis HA1 that is located at a distance from the first machine axis MA1. The lifter 5 includes a holder 5.1 that grips an empty container 3. In the embodiment shown, the holder 5.1 includes a neck-ring holder that grips a container under a neck ring provided at the container's neck. In an alternative embodiment, the holder 5.1 is a gripper that has at least two gripper elements that can be moved relative to each other. These two gripper elements cooperate to grip the container 3 like pincers.

Referring to FIG. 2, the lifter 5 and the holder 5.1 cooperate to raise an empty container 3 from a first level H1 up to a second level H2. The first level is the level at which the transfer star 4 moves the containers 3. The second level H2 is the level at which a container is processed at the processing station 2a.

In the embodiment shown in FIG. 2, the lifter 5 pulls a container 3 out of its puck 3a. This leaves an unoccupied puck 3a in the holder 4.1 of the transfer star 4. As the lifter 5 lifts the container 3, a filling pipe of a filling element assigned to the processing station 2a enters the container's interior through its mouth. At the same time, the holder 5.1 presses the container's mouth onto the filling element. Once the container 3 has been raised and its mouth pressed into place, filling begins.

Meanwhile, the first conveyor 2 rotates in a phased manner about the first machine axis MA1. The rotation of the first conveyor 2 is controlled such that a next processing station 2a, which is immediately behind that into which the container 3 has just been raised, arrives with a filled container held just above the recently-vacated puck 3a on the transfer star 4. In particular, the next processing station 2a is oriented above the tangential contact point in such a way that the filled container 3 is positioned precisely above a free puck 3a still located at the unoccupied container holder of the transfer star 4.

The lifter 5, to which the filled container is coupled, then lowers the filled container 3 from the processing position into the free puck 3a of the transfer star 4. The transfer star 4 can then deliver the filled container 3 to the second conveyor 6 after one or more further phased rotations. In the illustrated embodiment, the filled container arrives at the second conveyor 6 after two further phased rotations.

The further movement of the filled container 3 also takes place in a phased manner. In particular, the transfer star 4 rotates about an angle that is defined by an angle between two consecutive recesses 4.1 or pucks 3a of the transfer star 4. Meanwhile, the phased rotation of the filled container brings a new empty container to the transfer position ÜP so that the entire cycle starts all over again.

The lifter 5 and the holder 5.1 provided on it are designed to avoid collisions between the holder and the container when moving a container 3 to be filled to the transfer position ÜP. One way to do this is to configure the holder 5.1 to shift radially relative to the first machine axis MA1. This makes it possible to shift the holder 5.1 between a withdrawn position, in which it is outside the movement path of the container 3, and a forward position, in which it at least partially grips the container 3.

In some embodiments, the holder 5.1 or the lifter 5 swivels about the lifter axis HA. In this way, when an empty container 3 arrives at the transfer position ÜP, it is possible to align the holder 5.1 so as to move the container and to swivel the holder 5.1 back to permit collision-free entry into the recess provided on the holder 5.1.

In some embodiments, in which a holder 5.1 is a neck-ring holder, the holder 5.1 has a slot that receives the neck. As an empty container 3 approaches the transfer position ÜP, the slot can be aligned with the container's neck so that when the container 3 finally reaches the transfer position ÜP, the neck is already in the slot. As the container 3 reaches the transfer position, the holder 5.1 swivels away, taking the container 3 with it. It is also possible to carry out a collision-free exit of the container 3 in a similar way by swiveling the holder 5.1, or perhaps even the entire lifter 5, in the direction of the outgoing filled container 3.

In some embodiments, the holder 5.1 includes a gripper that has two gripper elements that swivel and move relative to each other. In such embodiments, it is possible to move the gripper elements relative to each other in a way that permits collision-free entrance and exit of a container. In particular, it is possible to open the gripper wide enough to place the gripper elements outside the movement path of the incoming or outgoing container 3.

In some embodiments, the first conveyor 2 and the transfer star 4 rotate in opposite directions at the same time. This allows slotting of the holder 5.1 on the container 3 and thus a collision-free entry and exit of the container 3.

When an empty container 3 enters the transfer position ÜP, the free processing station 2a that receives the empty container moves by turning the first conveyor 2 against the direction in which the container 3 moves. This occurs shortly before the transfer star 4 moves the empty container 3 in the direction of the transfer position ÜP. This positions the holder 5.1 in a way that enables collision-free entry of the container 3 into the recess provided on the holder 5.1.

After slotting the container 3 into the recess, the first conveyor 2 and the transfer star 4 rotate simultaneously in opposite directions. This counter-rotation occurs until the container 3, which is being moved by the transfer star 4, and the processing station 2a of the first conveyor 2 are located at the tangential contact point or at the transfer position ÜP.

To cause a collision-free entry starting from the position at which the container-free station 2a is located at the transfer position ÜP, the first conveyor 2 completes a rotation about an angle in the same direction of rotation in which the transfer star 4 rotates. Then, after the container 3 has been slotted, it rotates back against the direction of rotation of the transfer star 4 to the transfer position ÜP.

In the same way, it is possible to carry out a collision-free exit by simultaneously rotating the transfer star 4 and the first conveyor 2 and unslotting the holder 5.1 from the position in which it grips the container 3. One way to carry this out is to rotate the first conveyor 2 through an angle in a direction that is opposite the direction in which the transfer star 4 rotates. Once the container 3 has been unslotted, the first conveyor 2 turns back to the transfer position ÜP.

It is also possible for the first conveyor 2 to turn back and stop slightly beyond the transfer position ÜP. This will prepare the first conveyor 2 to slot the holder 5.1 on the next incoming container 3, as described above. This procedure is most suitable for those cases in which no different levels are provided.

Figure 3:
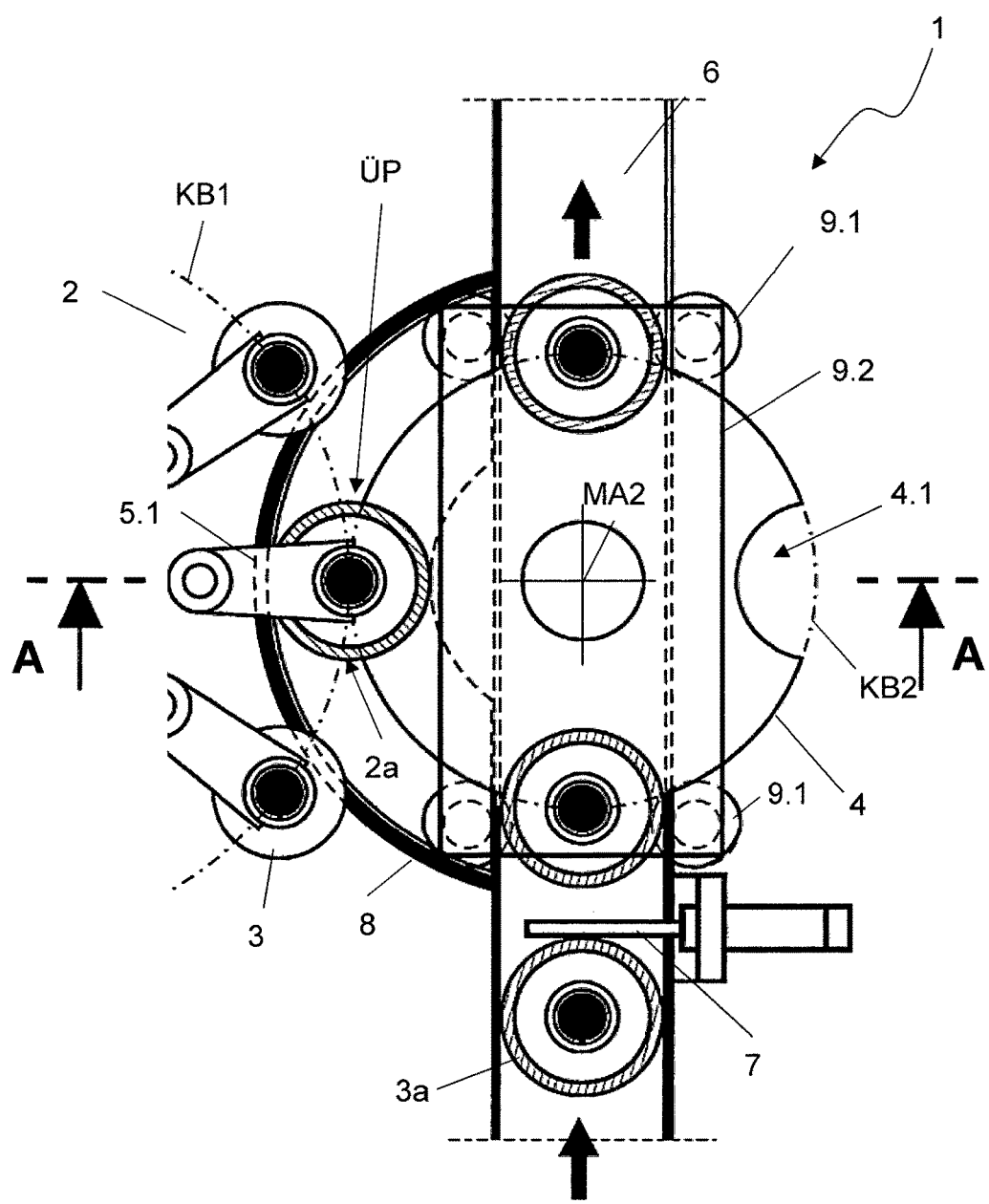
FIG. 3 shows a second embodiment of a container-processing machine, viewed from above.
Figure 4:
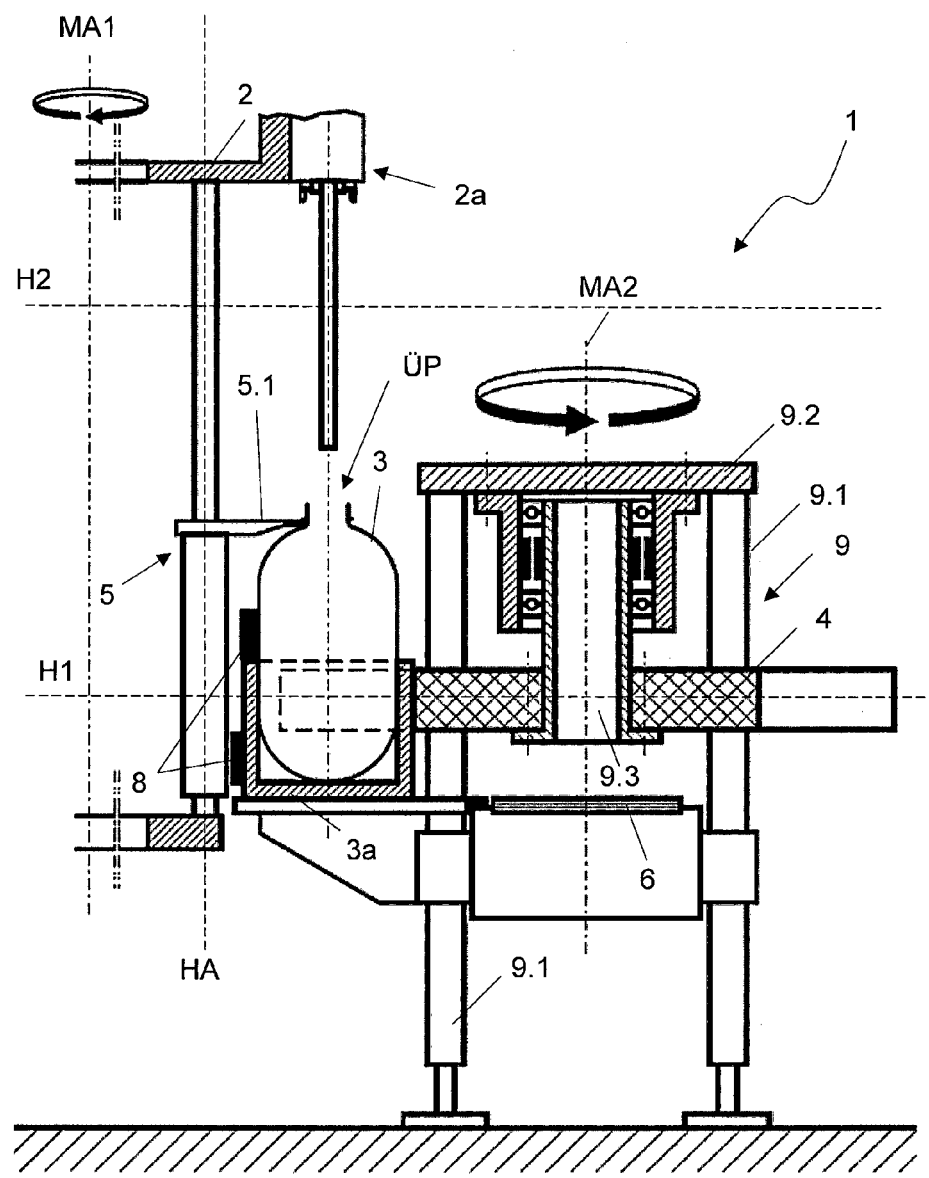
FIG. 4 shows a cross-section of the container-processing machine of FIG. 3 along the line A-A.

FIGS. 3 and 4 show a second embodiment of the container-processing machine 1 that differs from the first embodiment primarily by the position of the second conveyor 6 relative to the transfer star 4 and by the design of the transport star 4 itself. Unless otherwise described below, the statements previously made still apply.

In the embodiment shown in FIG. 3, the second conveyor 6 passes underneath the transfer star 4 in such a way that the second conveyor 6 passes centrally underneath the second machine axis MA2 so that a center line of the second conveyor 6 is always under the second machine axis MA2.

As shown in FIG. 3, a single continuous second conveyor 6 delivers empty containers to the transfer star 4 and removes filled containers 3 from the transfer star 4.

Referring now to FIG. 4, a securing device 9 suspends the transfer star 4 in a manner that permits rotation. This creates free space necessary to route the second conveyor 6 centrally under the transfer star 4.

The securing device 9 is a rack having multiple columns 9.1 connected at the tops thereof by a connecting plate 9.2. A cylinder 9.3 extends downward from the connecting plate 9.2. The cylinder 9.3 connects permanently to the connecting plate 9.2 and forms the second machine axis MA2 about which the transfer star 4 rotates.

The foregoing design eliminates the otherwise usual substructure under a transfer star 4. It also permits a central delivery of containers 3 along a path that crosses the second machine axis MA2 with the second conveyor 6 running underneath the transfer star 4. Further functional elements provided to deliver containers 3 to the container-processing machine 1 can be fixed on the securing device 9, including, for example, the second conveyor 6, slide panels, and external guides.

A direct drive drives the transfer star 4. This direct drive is preferably arranged between the connecting plate 9.2 and the transfer star 4. In some embodiments, the direct drive is a torque motor.

Figure 5:
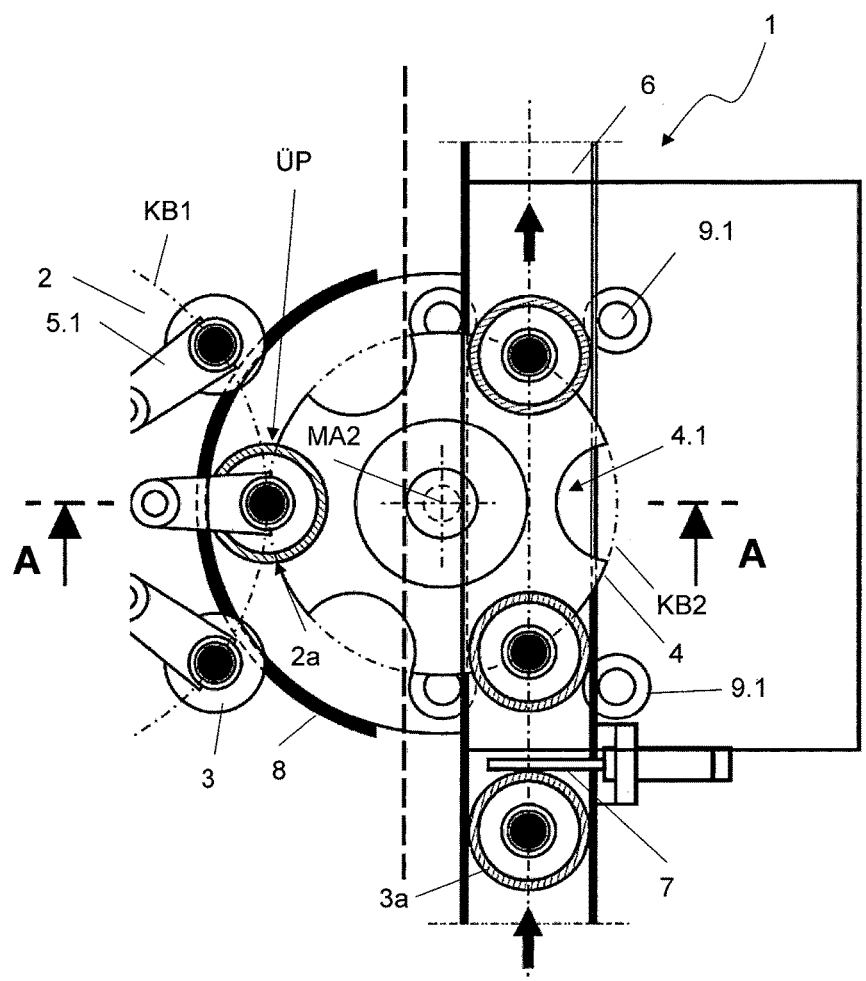
FIG. 5 shows a third embodiment of a container-processing machine viewed from above.
Figure 6:
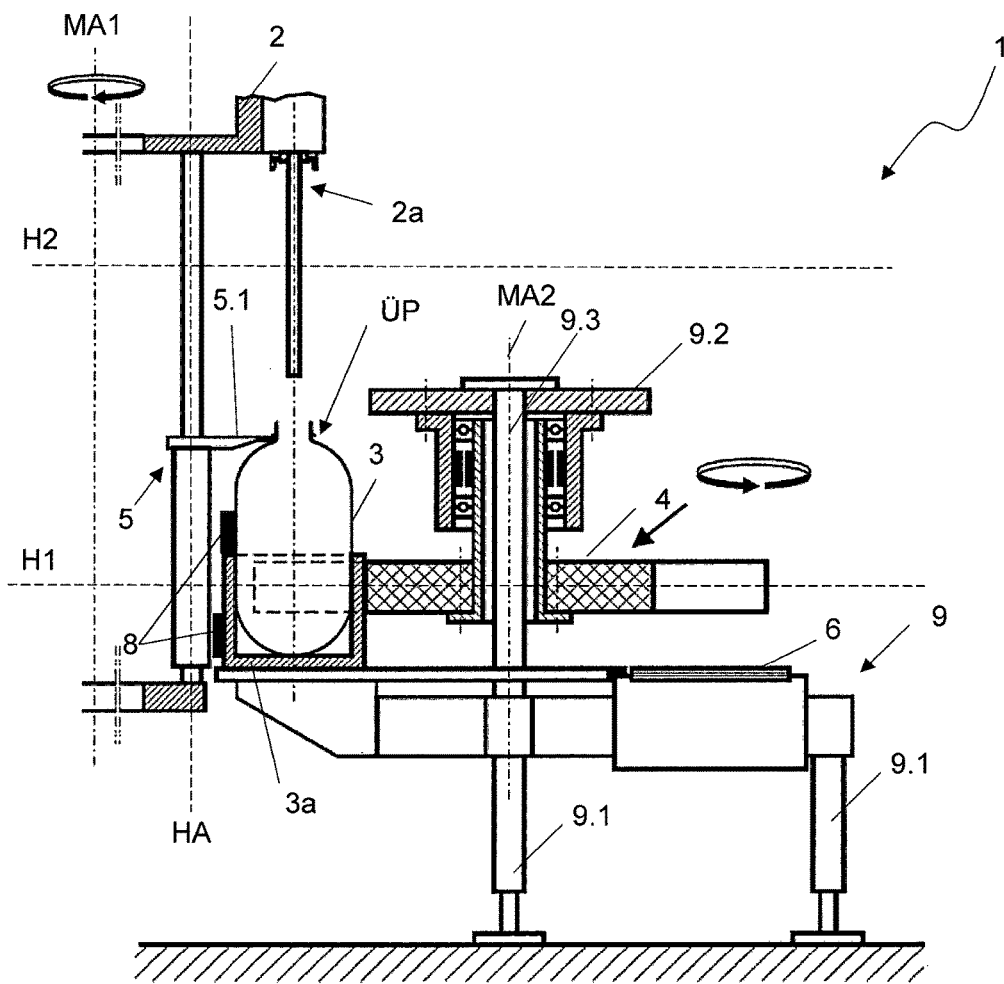
FIG. 6 shows a cross-section of the container-processing machine of FIG. 5 along the line A-A.

FIGS. 5 and 6 show a third embodiment of the container-processing machine 1. Unless otherwise described below, the statements previously made concerning the preceding embodiments continue to be applicable.

In the embodiment shown in FIG. 5 the second conveyor 6 passes underneath the transfer star 4 along a path that is offset laterally relative to the second machine axis MA2. As was the case in the preceding embodiment, a direct drive, such as a torque motor, drives the transfer star 4.

Unlike the first embodiment, this third embodiment includes an upright mounting of the transfer star 4 on a rack that has a column 9.1, best seen in FIG. 6. This column 9.1 forms the second machine axis MA2 of the transfer star 4. Further functional elements provided to deliver containers 3 to the container-processing machine 1 can be arranged on the rack. These include the second conveyor 6, slide panels, and external guides.

Figure 7:
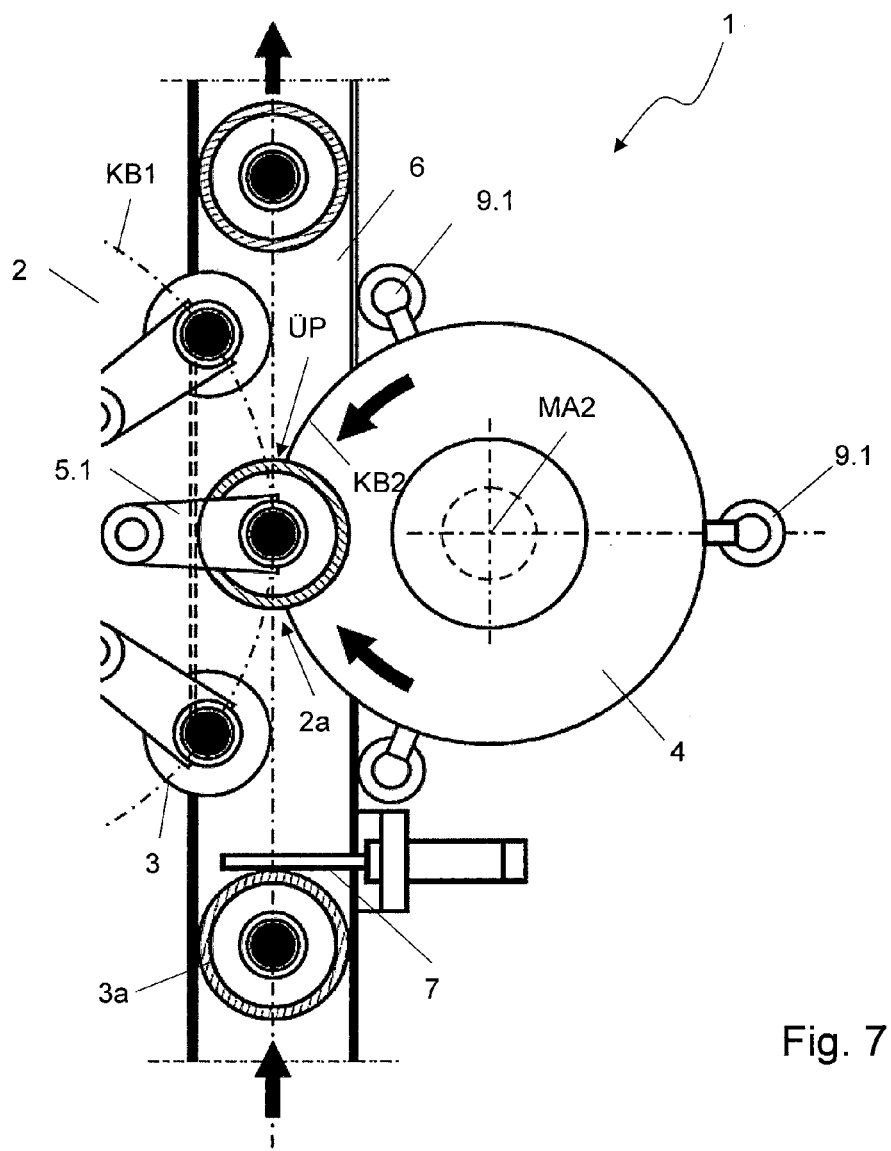
FIG. 7 shows a fourth embodiment of a container-processing machine as seen from above.

In another embodiment, shown in FIG. 7, the second conveyor 6 is arranged between the first machine axis MA1, and the second machine axis MA2. The second conveyor 6 preferably runs immediately underneath a processing station 2a that is located at the transfer position ÜP. In this embodiment, the transfer star 4 only receives a container 3 at a recess 4.1 thereon. To receive the container 3 in its recess 4.1, the transfer star 4 turns about an angle in a phased manner in a first direction of rotation, for example in an anti-clockwise direction of rotation. Once the recess 4.1 has received an empty container 3, the transfer star 4 turns back to position the container 3 at the transfer position ÜP.

To remove a filled container 3, the transfer star 4 turns clockwise. This is a direction that is the opposite of the direction that was used to deliver the container. As a result of this rotation, the filled container 3 is removed from the recess 4.1 and taken away by the second conveyor 6.

The preceding embodiments includes one single continuous second conveyor 6 to deliver the empty containers 3 to the transfer star 4 and to remove the filled containers 3. This second conveyor 6 is routed in sections underneath the transfer star 4. However, in other embodiments, there are two second conveyors 6 that are separate from each other. One of these is for delivery and the other is for removal.

In other embodiments, the transfer star 4 delivers filled containers to another container-processing machine instead of to a conveyor that carries the containers away.

Having described the invention, and a preferred embodiment thereof, what is new, and secured by Letters Patent is:

1. An apparatus for processing containers, said apparatus comprising a container-processing machine, said container-processing machine comprising a conveyor, processing stations, a star, and recesses, wherein said conveyor rotates about a vertical machine axis, wherein said processing stations are disposed around said conveyor for processing containers, wherein said star delivers containers that are in a first state to said conveyor and removes containers that are in a second state from said conveyor, wherein said recesses are disposed around a periphery of said star for engaging containers, wherein containers in said first state are containers that are to be processed by a processing station, and wherein containers in said second state are containers that have been processed by said processing station, and wherein said container-processing machine is configured to transfer a container that is in said first state to a processing station of said container-treatment machine by raising said container from a transfer position into a processing position, and wherein said conveyor and said star are driven independently of each other.

2. The apparatus of claim 1, wherein said container-processing machine comprises a first level and a second level, wherein delivery of said containers to said conveyor by said star and removal of said containers from said conveyor by said star takes place at said first level, and wherein processing of containers at said processing stations occurs at said second level, and wherein said second level is higher than said first level.

3. The apparatus of claim 2, further comprising lifters on said conveyor, wherein each of said lifters is configured to raise a container from said first level up to said second level and to lower a container from said second level down to said first level.

4. The apparatus of claim 3, wherein each of said lifters is assigned to a corresponding processing station, and wherein said lifters operate independently of each other.

5. The apparatus of claim 3, wherein each of said lifters comprises a neck-ring holder for lateral gripping of a container underneath a neck ring thereof.

6. The apparatus of claim 3, wherein each of said lifters is configured to move in a radial direction relative to a machine axis of said conveyor.

7. The apparatus of claim 3, wherein each of said lifters comprises a holder that is configured to grip a container.

8. The apparatus of claim 7, wherein said holder comprises a gripper that comprises first and second interacting gripper elements that are movable to enable transfer of a container between said conveyor and said star to proceed without hindrance.

9. The apparatus of claim 7, wherein said holder is configured to move in a radial direction relative to a machine axis of said conveyor.

10. The apparatus of claim 1, wherein said conveyor and said star are configured to be driven intermittently.

11. The apparatus of claim 1, wherein said conveyor is configured to be driven to rotate in a first direction, wherein said star is configured to be driven to rotate in a second direction, and wherein said first and second directions are opposite directions.

12. The apparatus of claim 1, wherein said conveyor is configured for phased rotation in a first direction along an angle, wherein said star rotates in a second direction opposite said first direction, wherein said rotation in said second direction and said phased rotation in said first direction occur simultaneously to allow collision-free gripping of said container by said holder.

13. The apparatus of claim 1, wherein said conveyor runs underneath said star.

14. The apparatus of claim 1, wherein said container-processing machine comprises an inspection machine.

15. A method for transferring containers between a conveyor of a container-processing machine and a star, said method comprising delivering a first container to a recess on a circumference of said star, said container being in a first state, as a result of rotation of said star, moving said first container to a transfer position, with said container now at said transfer position, raising said container from said transfer position into a processing position at a processing station on said conveyor, with said first container now engaged at said processing position, rotating said conveyor to a position at which a second container, which is in a second state, is positioned above a free recess of said star, transferring said second container into said free recess, and removing said second container, wherein a container in said first state is a container that has yet to be processed by said container-processing machine, and wherein a container in said second state is a container that has already been processed by said container-processing machine, said method further comprising driving said conveyor and driving said star, wherein driving said conveyor is carried out independently of driving said star.

16. The method of claim 15, wherein raising said container comprises lifting said first container with a lifter that is provided on said conveyor, and wherein lifting said first container forms a free recess in said star.

17. The method of claim 15, wherein transferring said second container into said free recess comprises using a lifter associated with a processing station at which said second container was processed to lower said second container into said free recess.

18. The method of claim 17, wherein said lifter comprises a holder for gripping said container, said method further comprising swiveling said holder so as to avoid a collision with a container moved by said star during rotation of at least one of said conveyor and said star.

19. The method of claim 15, further comprising driving said conveyor and driving said star, wherein driving said conveyor is carried out in a phased manner, and wherein driving said star is carried out in a phased manner.

20. The method of claim 15, further comprising, during a first interval, causing said conveyor and said star to rotate in opposite directions, and, during a second interval, causing said conveyor and said star to rotate in the same direction.

21. The method of claim 20, further comprising, during said first interval, swiveling an element out of the way to promote collision-free transfer of said container at said transfer position.

22. The method of claim 15, further comprising, using said conveyor, delivering a container to said star, passing said conveyor under said star, and removing said container from said star.

23. The apparatus of claim 1, wherein said container-processing machine comprises a filling machine.

24. The apparatus of claim 1, wherein said container-processing machine comprises a rinsing machine.

* * * * *